United States Patent

[11] 3,611,267

[72] Inventor Ellsworth A. Edling
Willow Grove, Pa.
[21] Appl. No. 867,045
[22] Filed Oct. 16, 1969
[45] Patented Oct. 5, 1971
[73] Assignee Transducer Systems, Inc.
Willow Grove, Pa.

[54] APPARATUS FOR OPTICAL CHARACTER RECOGNITION
7 Claims, 2 Drawing Figs.

[52] U.S. Cl. .......... 340/146.3 Y, 178/6
[51] Int. Cl. .......... G06r 9/00
[50] Field of Search .......... 340/146.3; 178/6, 6 B; 250/237

[56] References Cited
UNITED STATES PATENTS

| | | | |
|---|---|---|---|
| 3,330,964 | 7/1967 | Hobrough et al. .......... | 250/237 |
| 3,344,231 | 9/1967 | Dodd et al. .......... | 178/6 |
| 3,347,981 | 10/1967 | Kagan et al. .......... | 178/6 |

*Primary Examiner*—Thomas A. Robinson
*Attorney*—Jacob Trachtman

ABSTRACT: A method and apparatus for optical character recognition including a video camera for scanning a page of printed matter along a scanning pattern which progresses across the page from side-to-side along a plurality of lines which are spaced apart from top to bottom of the page. Means is provided for creating a count which indicates the position of the camera along the scanning pattern. A discrimination means is provided for the recognition of color reversals sensed by the camera during the scan. A data output section provides an output signal which is the count of the counter each time that the camera senses a color reversal. The count of the output signal is in binary digital form which can be easily transmitted to a receiver device.

PATENTED OCT 5 1971 3,611,267

INVENTOR
ELLSWORTH A. EDLING
BY Jacob Trachtman
ATTORNEY

APPARATUS FOR OPTICAL CHARACTER RECOGNITION

The present invention relates to a method and apparatus for optical character recognition, and more particularly to a method and apparatus for discrete digital transcription of optically scanned patterns.

Virtually all existing optical character recognition systems for electronically reading printed matter use a vertical scanning arrangement. Such systems have many problems which make them hard to fit into most applications. The vertical scanning requires that either the printed lines must be carefully spaced and placed, or else intricate controls must be employed to sense the top and bottom of each line. Thus, the operations of these systems have been characteristically slow. Also these systems use a technique which requires them to manipulate a large amount of data, often more than is really needful. This not only requires a complex apparatus, but also allows for more opportunity for poor transcription of the data. Although there are existing systems which scan horizontally, these systems scan an entire page in a single pass through the use of a photo-element array. This requires a complex apparatus which can store the whole page before even the first line can be treated.

It is an object of the present invention to provide a novel method and apparatus for the optical recognition of characters.

It is another object of the present invention to provide a novel method and apparatus for transcribing optically scanned patterns.

It is still another object of the present invention to provide a method and apparatus to transcribe optical patterns in a discrete manner into a binary coded form that facilitates reliable, low noise data transmission and interim storage.

These objects are achieved by a method and apparatus wherein a page of printed matter is scanned by a spot of light which progresses along a plurality of spaced lines from one side edge of the page to the other, and from the top of the page to the bottom of the page, or as by a video camera tube. Means is provided for determining the instantaneous position of the scanning spot, such as binary digital counters connected to the video deflection circuits of the video camera tube. Means is provided to render a readout of the position of the scanning spot at each point that the scanning means senses a significant change in video signal, such as when the scanning spot passes from a light background to a dark printed matter or vice versa. The readout is the count of the counter in binary form at each point of the scanning pattern that the scanning spot senses a color reversal on the printed page. The output can be transmitted to a reproduction device, or to a storage means, such as a magnetic tape. Since the readout is the positions along the scanning pattern of each color reversal on the printed page, upon reproduction the same color reversals will be reproduced at the same positions along the scanning pattern to reproduce the same printed matter.

For the purpose of illustrating the invention there is shown in the drawings a form which is presently preferred; it being understood, however, that this invention is not limited to the precise arrangements and instrumentalities shown.

Figure 1:
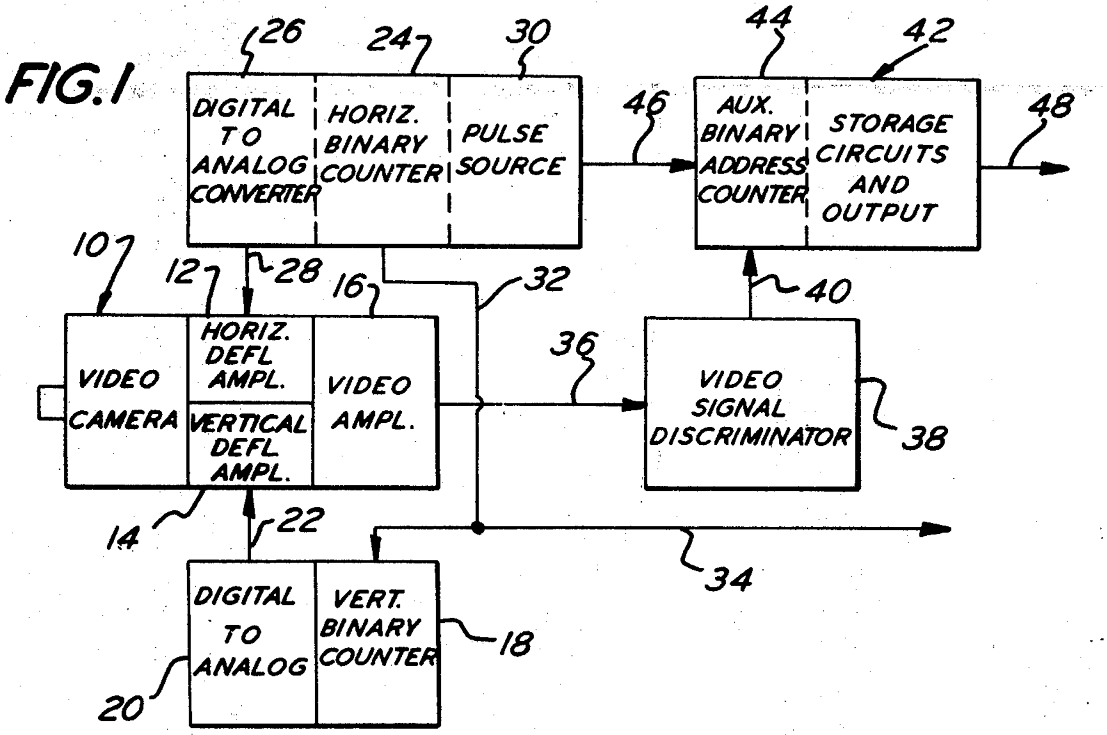
FIG. 1 is a block diagram of the apparatus of the present invention.

Referring to FIG. 1, the optical character recognition apparatus of the present invention comprises a video camera 10, such as a vidicon, which has a scanning pattern which progresses horizontally from side-to-side along a plurality of vertically spaced lines. The camera 10 includes a horizontal deflection amplifier 12, a vertical deflection amplifier 14, and a video amplifier 16. A precisely controlled vertical deflection source 18, which is a binary counter, is compatibly connected by a digital-to-analog converter 20 and and a line 22 to the vertical deflection amplifier 14 of the camera 10. The counter 18 counts the completion of each horizontal trace of the camera 10. A precisely controlled horizontal deflection source 24, which is also a binary counter, is comparably connected through a digital-to-analog converter 26 and line 28 to the horizontal deflection amplifier 12 of the camera 10. However, the horizontal counter 24 and its converter 26 are capable of performing at much higher speed than the vertical counter 18 and its converter 20. The horizontal counter 24 counts the pulses generated by an associated high frequency pulse source 30 which generates a plurality of pulses during each horizontal sweep by the camera 10. The horizontal counter 24 is connected to the vertical counter 18 by a line 32 so that at the end of each horizontal count a signal is provided whereby the vertical counter is advanced. This signal is also delivered by line 34 to a receiving device so as to provide a control signal for the receiving device. Thus, the count of the horizontal counter 24 indicates the position of the trace of the camera 10 along each horizontal sweep, and the count of the vertical counter 18 indicated the particular line of the trace.

The video amplifier 16 of the camera 10 is connected by line 36 to a video signal discriminator 38 which selects the points along the trace of the camera that merit locational description. The discriminator 38 includes storage and comparison circuits that enable the discriminator to detect any reversals in the trend of change of the signal level from the video amplifier 16 of the camera 10. Such circuits include elements for the continuous analog-to-digital conversion of the video signal plus storage and comparator elements to sense all second order changes, i.e., all reversals of video intensity.

The discriminator 38 is connected by a line 40 to a data output section 42. The data output section 42 responds to each command signal from the discriminator 38 to deliver digitally coded data that locationally describes the point at which a second order video change was detected. This data is a binary value which represents the number of pulses that were counted by the horizontal deflection counter 24 since the time of its prior readout. For this purpose the data output section 42 includes an auxiliary relative address counter 44 which is connected by a line 46 to a pulse source 30. The data output section 42 can also include storage circuits to internally note the data for a short period of time to accommodate the rate of reception of the receiving device. In addition, the data output section 42 can include means whereby the binary data can be segmented into a series of interconnectable modules which facilitate accommodation of virtually any size of data interface. The data output section 42 is connected by a line 48 to a receiver, not shown. The receiver can be either a device for reproducing the printed matter, or a device for storing the data, such as a magnetic tape or disc.

In the use of the optical character recognition apparatus, the video camera 10 provides a spot which scans a page of printed matter along a scanning pattern which extends across the page from side-to-side, such as from left to right, along a plurality of spaced lines and sequentially along the lines from top to bottom of the page. The scan across the page is controlled by the horizontal deflection amplifier 12 of the camera 10, and the scan from line to line is controlled by the vertical deflection amplifier 14. As the spot scans across a line, the horizontal deflection counter 24 counts a plurality of pulses generated by the pulse source 30. The horizontal deflection counter 24 counts a preset number of counts per line. At the end of each line, as determined by the count of the horizontal deflection counter 24, a signal from the horizontal deflection counter advances the vertical deflection counter 18 and moves the scanning spot to the next line. Thus, the counts of the counters provide an accurate indication of the position of the scanning spot at any position along the scanning pattern.

Figure 2:
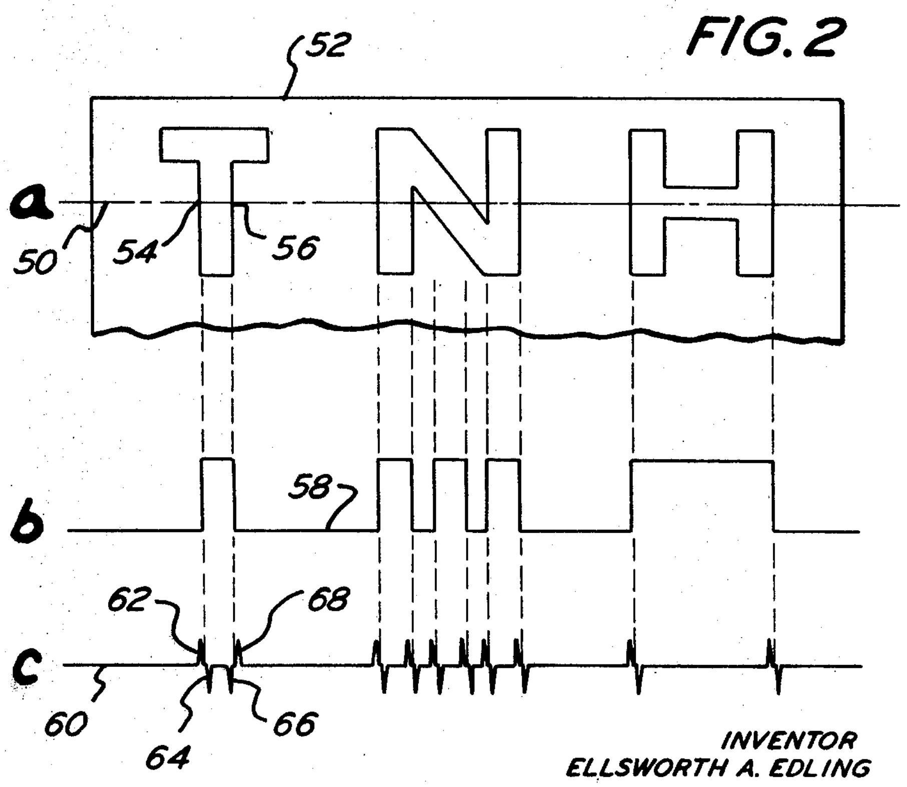
FIG. 2 is a diagram showing the manner of operation of the apparatus.

As the scanning spot moves along a line across the page, such as the line 50 across the page 52 in FIG. 2*a*, the scanning spot will cross over a portion of the printed matter on the page, such as the letters "T," "N" and "H" shown in FIG. 2*a*. When the scanning spot reaches the point 54 at the edge of the letter "T," it senses a change in the color of the page, which shown is from light to dark. This color reversal causes a change in the output signal of the video amplifier 16 of the camera 10. When the scanning spot reaches the point 56 at the other edge of the letter "T," it again senses a change in the color of the page, which as shown is from dark to light, so that the output of the video amplifier 16 of the camera 10 returns to its original output position. Thus, each time that the scanning spot senses a color reversal as a result of passing over printed matter, the output signal from the camera changes. This change in the output signal of the camera as it scans along the line 50 is shown by line 58 in FIG. **2*b***.

The video signal from the camera 10 is delivered to the video signal discriminator 38. The video signal discriminator 38 includes a circuit for taking the differential of the signal from the camera 10. The output of the differential circuit is shown by line 60 in FIG. **2*c*. When the output signal of the camera 10 increases, such as when the scanning spot reaches the point 54, the differential signal is a positive pulse 62 followed by a negative pulse 64. When the output signal of the camera 10 decreases, such as when the scanning spot reaches the point 56, the differential signal is a negative pulse 66 followed by a positive pulse 68**. Thus, the differential signal resulting from each color reversal is a pair of pulses, one positive and the other negative, with the direction of the color reversal, i.e., light to dark or dark to light, being indicated by which of the two pulses is first.

The signal from the video signal discriminator 38 is delivered to the data output section 42. Each pulse from the discriminator 38 triggers the data output section 42 to read out the count of the relative address counter 44 at the time of the occurrence of the pulse. Since the relative address counter 44 is counting the same pulses as the horizontal deflection counter 24, the count readout of the relative address counter 44 will indicate the position of each color reversal along the scanning pattern. The output of the relative address counter 44 in binary digital form is delivered by line 48 to a receiving device. Although the line 48 is shown as a single line, it is actually a plurality of lines of a number corresponding to the number of bits of the counter 44. Thus, the optical character recognition apparatus of the present invention delivers a series of binary digits representing the position of each color reversal along the scanning pattern of the camera 10.

If the output from the optical character recognition apparatus of the present invention is delivered to a storage device, such as a magnetic tape, only the binary numbers delivered from the data output section 42 are recorded on the tape. Since the binary number output signals represent the positions of the color reversals, any time lag between the delivery of the signals is of no significance. Thus, the magnetic tape on which the signals are recorded does not have to be moving continuously, but only has to be advanced each time that a binary signal is recorded. This permits the recording of a relatively large amount of data per unit length of the tape so that all of the data from a scanning pattern can be recorded on a relatively small amount of the tape. To reproduce the data, either directly from the optical character recognition apparatus of the present invention or from the storage device, the binary number signals are delivered to a reproducing device which reverses the method described above. The reproducing device operates a printout means to cause a color reversal at intervals along a scan represented by the binary number signals. Thus, the reproduction will be an exact copy of the original printed matter.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for optical character recognition comprising means for scanning along a pattern which extends from side-to-side along a plurality of spaced lines, means for sensing color reversals along the scanning pattern, means for providing a count which indicates the position along the scanning pattern at any time during the scan, and means for providing a readout of the counting means each time that a color reversal is sensed, the scanning means having a horizontal deflection means and a vertical deflection means which provide the scanning pattern, and the means for providing a count including a high-frequency pulse source for providing a plurality of pulses during each horizontal pass of the scanning means, a horizontal binary counter for counting the pulses during each horizontal pass, said horizontal counter being connected to the horizontal deflection means of the scanning means, and a vertical binary counter connected to the vertical deflection means of the scanning means, said horizontal counter being connected to the vertical counter so as to advance said vertical counter at the end of each horizontal pass of the scanning means.

2. Apparatus for optical character recognition comprising means for scanning along a pattern which extends from side-to-side along a plurality of spaced lines, means for sensing color reversals along the scanning pattern, means for providing a count which indicates the position along the scanning pattern at any time during the scan, and means for providing a readout of the counting means each time that a color reversal is sensed, the scanning means comprising a video camera having a horizontal deflection means and a vertical deflection means which provide the scanning pattern, and the means for providing a count including a high-frequency pulse source for providing a plurality of pulses during each horizontal pass of the camera, a horizontal binary counter for counting the pulses during each horizontal pass, said horizontal counter being connected to the horizontal deflection means of the camera, and a vertical binary counter connected to the vertical deflection means on the camera, said horizontal counter being connected to the vertical counter so as to advance said vertical counter at the end of each horizontal pass of the camera.

3. Apparatus in accordance with claim 2 in which the means for sensing color reversals includes means for receiving a video signal from the camera and for discriminating changes in the video signal resulting from color reversals sensed by the camera.

4. Apparatus in accordance with claim 3 in which the means for discriminating changes in the video signal include means for differentiating the video signal so as to provide output pulses upon the changes in the video signal.

5. Apparatus in accordance with claim 4 in which the means for providing a readout of the counter means is triggered by the output pulses of the discriminating means.

6. Apparatus in accordance with claim 5 in which the readout means includes a relative address counter connected to the high-frequency pulse source so as to provide a count corresponding to the increase in count of the horizontal binary counter between readouts, and the output signal of the readout means is the count of the relative address counter.

7. Apparatus in accordance with claim 6 in which the readout means includes means for providing the count of the relative address counter as an output signal in binary digital form.